July 1, 1958 J. M. McCULLEY 2,841,707

INFORMATION HANDLING SYSTEM

Filed April 19, 1954 2 Sheets-Sheet 1

INVENTOR.
James M. McCulley
BY
F.A. Reckig
AGENT

INVENTOR.
James M. McCulley
BY
[signature]
AGENT 2,841,707
Patented July 1, 1958

1

2,841,707

INFORMATION HANDLING SYSTEM

James M. McCulley, Barrington, N. J., assignor to Radio Corporation of America, a corporation of Delaware Application April 19, 1954, Serial No. 424,082

The terminal fifteen years of the term of the patent to be granted has been disclaimed 6 Claims. (Cl. 250—27)

This invention relates to an information handling system, and more particularly to a system wherein a multiplicity of pieces of information, or sets of data, are sequentially switched to a common utilization or output circuit, on a time division basis. The system of this invention is analogous to the transmitting terminal of a time division multiplex system, in which a plurality of intelligence channels are multiplexed onto a single common output circuit by a time-division process.

The system of this invention has particular utility in an object detecting system wherein a plurality of signals representing the azimuth components of various objects are to be applied to the horizontal deflection amplifier of a cathode ray oscilloscope, and wherein a plurality of signals representing the elevation components of the same objects are to be applied to the vertical deflection amplifier of a cathode ray oscilloscope.

An object of this invention is to provide a novel all-electronic information handling system (in which there are no moving parts) for switching or sampling a plurality of informations into a common utilization circuit, on a time division basis.

Another object is to devise a sampling system having a plurality of channels which are sequentially switched or gated to a common output circuit, in which each channel may be utilized to convey a plurality of separate informations to the common circuit.

A further object is to devise a novel form of pulse-controlled diode switching circuit for switching the output of a signal translating system to a utilization circuit.

The objects of this invention are accomplished, briefly, in the following manner: In each channel, alternating current information is detected or converted to direct current voltage by means of a synchronous or phase sensitive detector, following which other A. C. information is added to this D. C. information and the resultant signal is fed through a cathode follower to a diode switch which is capable of being controlled by gating pulses. The output sides of all the diode switches are connected to a common utilization circuit (e. g., a cathode follower driver amplifier), and by means of time sequenced gating pulses applied to the switches, they are closed in regular sequence to successively and sequentially apply the resultant signal developed in each channel to the common utilization or output circuit.

Figure 1:
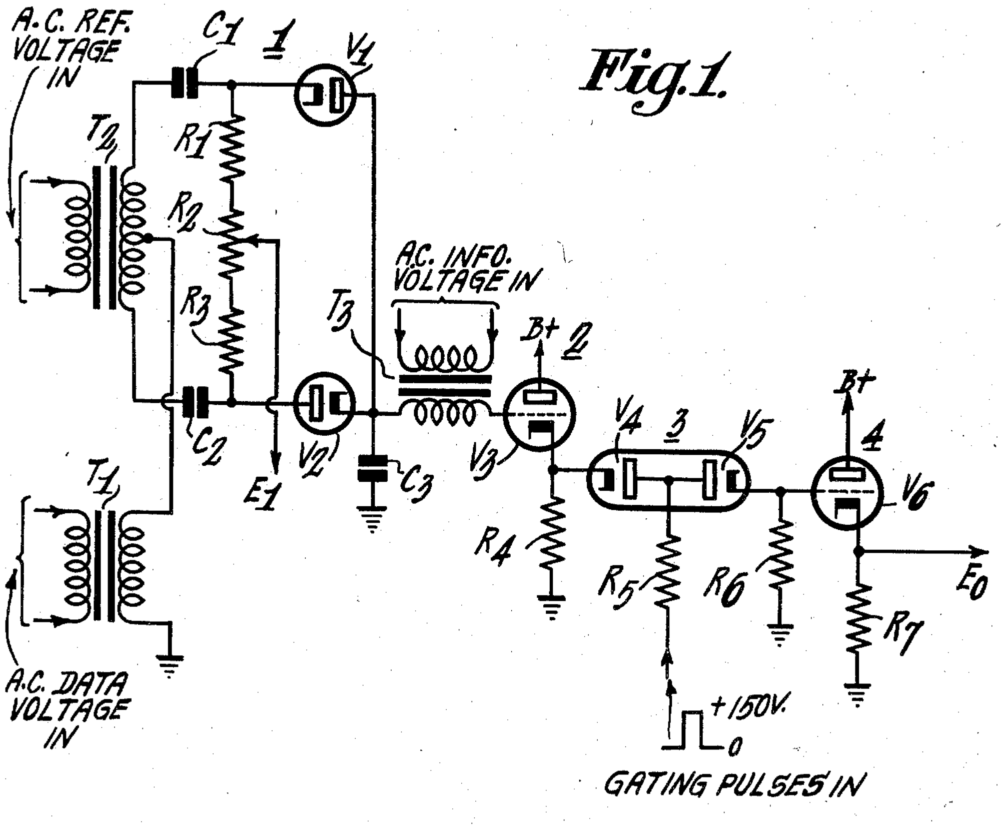
Figure 2:
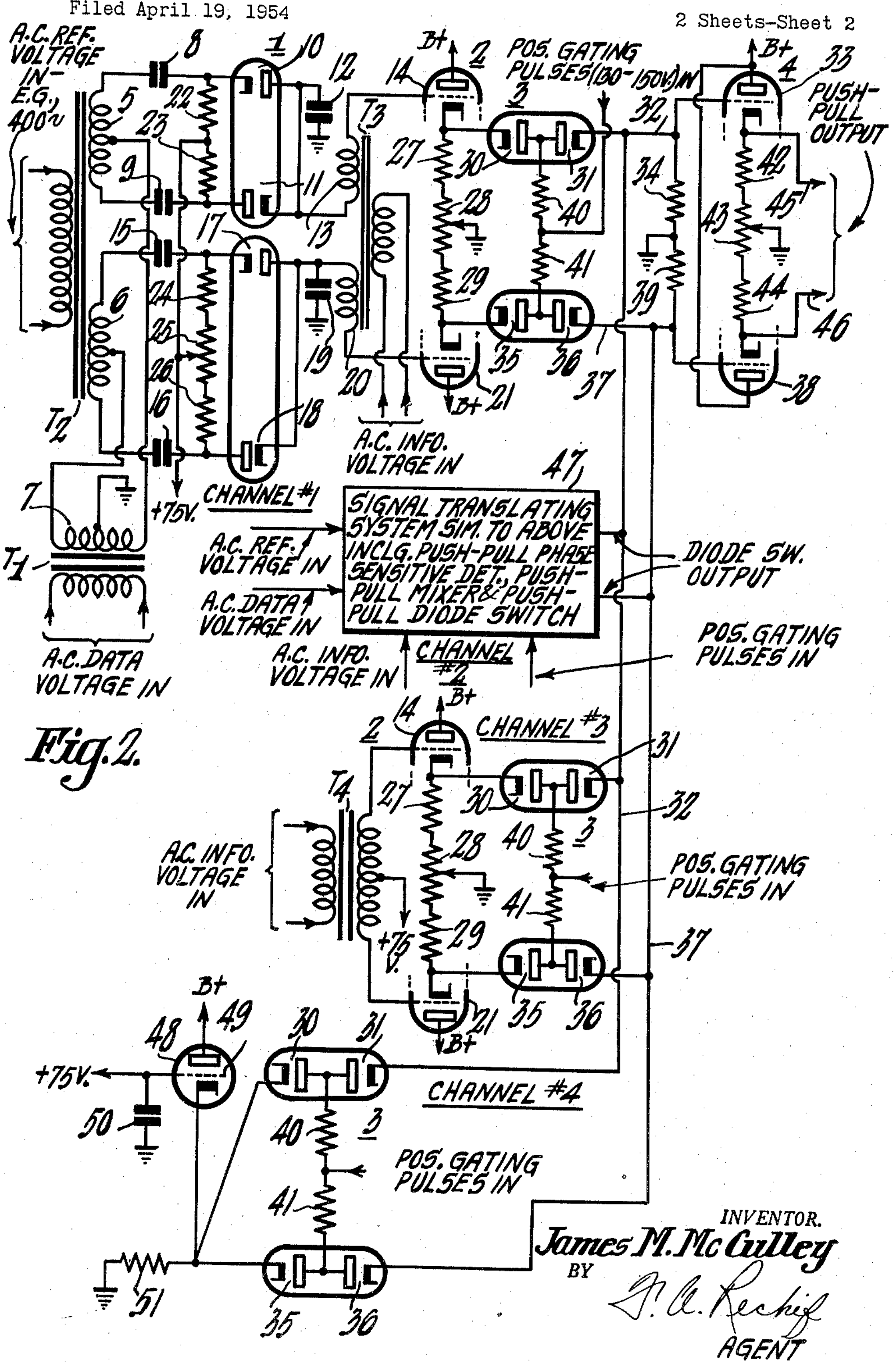

The foregoing and other objects of the invention will be best understood from the following description of some exemplifications thereof, reference being had to the accompanying drawings, wherein:

Fig. 1 is a single-ended equivalent of the signal translating and switching circuits for a single channel of the sampling system of this invention; and Fig. 2 is a schematic circuit diagram of a sampling system according to this invention, including four information channels and a typical push-pull circuit arrangement.

2

Referring now to Fig. 1, which represents a single-ended equivalent circuit for a single information channel, this circuit consists of four main parts cascaded in the order named: a phase sensitive detector 1, a cathode follower 2, a diode switch 3, and a cathode follower output circuit or driver circuit 4. Generally, speaking, each of the information channels has individual thereto the parts or units 1–3, while the output circuit 4 is common to all of the multiplex or information channels.

An alternating current reference voltage, for example of 400 C. P. S., is applied to the primary winding of an input transformer $T_2$. One end of the centertapped secondary winding of this transformer is connected through a coupling capacitor $C_1$ to the cathode of a diode vacuum tube $V_1$, while the other end of this secondary winding is connected through a similar coupling capacitor $C_2$ to the anode of a diode vacuum tube $V_2$. In this manner, the reference voltage is applied in opposite phase or antiphasally or in push-pull to the two diodes $V_1$ and $V_2$. To provide a positive voltage level for a purpose which will hereinafter become apparent, resistors $R_1$, $R_2$ and $R_3$ are connected in series between the cathode of diode $V_1$ and the anode of diode $V_2$. Resistor $R_2$ is a potentiometric resistor and a positive voltage $E_1$ (which may be about 75 volts, for example) is applied to the movable tap on this resistor. The anode of diode $V_1$ is connected to the cathode of diode $V_2$, and a capacitor $C_3$ is connected from the common junction of these two electrodes to ground.

A 400-C. P. S. data voltage (e. g., position information) is applied to the primary winding of a second input transformer $T_1$, one end of the secondary winding of this transformer being grounded and the opposite end thereof being connected to the center tap on the secondary winding of transformer $T_2$. In this way, the A. C. data voltage is supplied essentially in the same phase or cophasally or in push-push to the diodes $V_1$ and $V_2$.

The phase sensitive detector or synchronous detector 1 is basically a clamp circuit which utilizes a sine wave as the clamping voltage. During part of the cycle of the A. C. reference voltage supplied to the primary winding of $T_2$, diodes $V_1$ and $V_2$ conduct. This occurs when the lower end of the secondary winding of $T_2$ (that end connected to capacitor $C_2$) goes positive with respect to the center tap, at the same time that the upper end of the secondary winding of $T_2$ (that end connected to capacitor $C_1$) goes negative with respect to the center tap. It may be seen that the diodes $V_1$ and $V_2$ are so poled as to pass current when the polarities are as just discussed. Due to the conduction in these diodes, capacitors $C_1$ and $C_2$ become charged to the peak value of the reference voltage, as it appears in the secondary winding of $T_2$. The only discharge path (when $V_1$ and $V_2$ are not conducting to complete the charging path) for capacitors $C_1$ and $C_2$ is through resistors $R_1$, $R_2$ and $R_3$. These resistors are of high resistance value (as an example, $R_1$ and $R_3$ may be two megohms each and $R_2$ may be 100,000 ohms), so that the voltage across this resistance network is nearly the same 1/400 second later, when the next positive cycle of the 400-C. P. S. reference voltage recharges the capacitors $C_1$ and $C_2$. The final result of this operation is that the diodes $V_1$ and $V_2$ conduct only for short intervals near the peak of the reference voltage wave.

When the diodes $V_1$ and $V_2$ conduct, capacitor $C_3$ is connected to the secondary winding of $T_1$ (the A. C. data voltage input transformer) through two parallel networks, one consisting of the lower half of the secondary winding of $T_2$, capacitor $C_2$ and diode $V_2$ and the other consisting of the upper half of the secondary winding of $T_2$, capacitor $C_1$ and diode $V_1$. Capacitor $C_3$ is small enough (this capacitor may have a value of 0.05 mfd., for example) to be charged to the full instantaneous value of the data voltage in the secondary winding of $T_1$, during the time of conduction of the diodes, provided the A. C. data voltage does not change abruptly. Since the diodes conduct only near the peak of the reference voltage wave, and since the capacitor $C_3$ is charged at this instant to the value at the same instant of the data voltage wave, the more nearly in phase the two A. C. voltages are, the larger will be the charge on capacitor $C_3$. The charge on capacitor $C_3$ is thus proportional at all times to the phase of the data voltage with respect to the reference voltage.

The operation of the synchronous detector 1 (constituted by the elements so far described) has just been explained with reference to the production of D. C. information from an A. C. data voltage which varies in phase about some reference phase. However, it is desired to be pointed out that this detector will also produce D. C. information from an A. C. data voltage of the type produced as output by most "microsyn" type pickups, namely, a variable amplitude constant phase A. C. data voltage which shifts phase 180° at zero signal. Since capacitor $C_3$ is connected to the secondary winding of $T_1$ when diodes $V_1$ and $V_2$ conduct and since at this instant $C_3$ is charged to the full instantaneous value of the data voltage in the secondary winding of $T_1$, varying-amplitude data voltages result in corresponding varying-value charges on $C_3$, while data voltages of 180°-opposite phases result in opposite-polarity charges on $C_3$. In this case, then, the charge on capacitor $C_3$ corresponds at all times to the amplitude and the phase sense (of the two opposite phase senses) of the A. C. data voltage.

It may therefore be seen that unit 1 is a phase sensitive detector or synchronous detector which converts the A. C. data voltage supplied to $T_1$ to a D. C. voltage (the voltage across capacitor $C_3$).

The secondary winding of a transformer $T_3$ is coupled from the upper or ungrounded end of capacitor $C_3$ to the grid of a vacuum tube triode $V_3$ which is arranged in circuit to constitute the cathode follower previously referred to. Transformer $T_3$ serves to couple any desired A. C. component into the data voltage (positioning signal) appearing across capacitor $C_3$, and for this purpose the primary winding of transformer $T_3$ is coupled to any desired A. C. information voltage source. Thus, at the grid of tube $V_3$ there is a composite of D. C. and A. C. signals.

Increasing the size of capacitor $C_3$ relaxes the permissible capacity unbalance in transformer $T_3$, since one side of the secondary winding (the left side) then becomes more rigidly connected to ground for A. C. voltages. Furthermore, if capacitor $C_3$ has a high value the amount of pulse which will be fed through the diode switch 3 and which will appear in the output circuit 4, is lowered. Therefore, the size of capacitor $C_3$ should be made as large as is consistent with the maximum expected rate of change of the positioning voltage (data voltage) applied to transformer $T_1$.

Tube $V_3$ is connected as a cathode follower amplifier for driving the diode switch 3, and for this purpose the anode of tube $V_3$ is connected to the positive terminal B+ of a unidirectional potential source and the cathode of this tube is connected through a resistor $R_4$ to ground or the negative side of the source of unidirectional potential. The composite of D. C. and A. C. signals applied to the grid of tube $V_3$ is translated by this tube and appears across the resistor $R_4$.

It is desired to swing the grid of tube $V_3$ both positive and negative about a reference so it is necessary to raise this grid to some positive voltage, about 75 volts, by means of the voltage $E_1$ which is derived from a suitable source and applied to the movable tap on resistor $R_2$. This voltage $E_1$ is in effect applied to the grid of tube $V_3$ when the diodes $V_1$ and $V_2$ conduct. Adjustment of the potentiometer $R_2$ serves to shift the grid voltage of tube $V_3$, much the same as changing the value of $E_1$.

A pair of diodes $V_4$ and $V_5$ are arranged to function as diode switches. Both diodes may be in the same envelope, or they may be in separate envelopes. The cathode of diode $V_4$ is connected directly to the upper ungrounded end of resistor $R_4$ and to the cathode of $V_3$. The anode of $V_4$ is connected directly to the anode of $V_5$. Finally, the cathode of $V_5$ is connected directly to the grid of a vacuum tube triode $V_6$ which is connected to provide the cathode follower output circuit (driver circuit) 4. A resistor $R_6$ is connected from the cathode of $V_5$ (grid of $V_6$) to ground. A positive gating voltage or gating pulse, derived from a suitable source of rectangular waves, is applied through resistor $R_5$ to the common junction of the anodes of $V_4$ and $V_5$.

When a positive voltage (on the order of 130 to 150 volts, for example) is applied to the lower end of $R_5$ and hence to the anodes of the diodes, diodes $V_4$ and $V_5$ conduct. Since these diodes when conducting are of fairly low impedance, the voltage across $R_4$ will then appear across $R_6$. As previously stated, the voltage which appears across $R_4$ is a composite of D. C. and A. C. signals. Resistor $R_5$ is considerably larger than the impedance looking into the cathode of tube $V_3$, so the gating voltage does not raise appreciably the voltage across $R_4$. The diodes $V_4$ and $V_5$ conduct only when a positive voltage is applied to the lower end of $R_5$, so that these diodes switch or gate the output of tube $V_3$ to resistor $R_6$.

The voltage across $R_6$ is applied as an input voltage to the grid of the driver cathode follower amplifier tube $V_6$, which serves as a low-impedance source for driving a deflection amplifier (not shown). If the deflection amplifier is on the same chassis as the mixer of Fig. 1, the driver stage $V_6$ may not be required. The anode of tube $V_6$ is connected directly to the positive terminal of a unidirectional source and this tube provides a cathode follower output voltage $E_O$ across a resistor $R_7$ which is connected between the cathode of tube $V_6$ and ground.

If a plurality of channels are utilized according to this invention, as will become apparent from a study of Fig. 2, each channel is provided with a separate diode switch similar to $V_4$, $V_5$ and the output sides of these diode switches are connected together and to the grid or input electrode of tube $V_6$, the driver cathode follower. With six channels arranged in parallel in this manner, the gating voltage pulses are applied to each set of diode switches in a regular, predetermined sequence. Then, the output signal across resistor $R_7$ will be six displays, time shared in the same manner.

Reference will now be made to Fig. 2, which discloses a push-pull amplifying and mixing channel, as well as several other types of multiplexed channels, and in which the outputs of the several individual channels are sequentially applied to a single, common utilization circuit. In Fig. 2, insofar as convenient, elements the same as those of Fig. 1 are denoted by the same reference numerals.

In Fig. 2, the A. C. reference voltage is applied to the primary winding of a transformer $T_2$ which has two secondary windings 5 and 6 each of which is centertapped. The A. C. data voltage (e. g., positioning voltage) is applied to the primary winding of a transformer $T_1$ which has a centertapped secondary winding 7. The center tap of winding 7 is grounded and the two opposite ends of this winding are connected one to each of the respective center taps on windings 5 and 6. In this way, push-pull voltages derived from the data voltage source are supplied to the two parts of the phase-sensitive detector 1. One end of winding 5 is connected through a capacitor 8 to the cathode of a diode 10, while the opposite end of this winding is connected through a capacitor 9 to the anode of a diode 11. Diodes 10 and 11 may be in the same envelope, for example, and these diodes may comprise a 6AL5 tube. The anode of diode 10 is connected to the cathode of diode 11, and a capacitor 12 (which corresponds to capacitor $C_3$ in Fig. 1) is connected from the common junction of these two last-named electrodes to ground. A connection extends from the ungrounded terminal of capacitor 12 through one secondary winding 13 of a transformer $T_3$ having two secondary windings to the grid of a cathode follower triode structure 14 in the cathode follower unit 2.

Similarly for the other side of the push-pull circuit, one end of winding 6 is connected through a capacitor 15 to the cathode of a diode 17, while the opposite end of this winding is connected through a capacitor 16 to the anode of a diode 18. Diodes 17 and 18 may be in the same envelope, for example, and these diodes may comprise a 6AL5 tube. The anode of diode 17 is connected to the cathode of diode 18, and a capacitor 19 (which also corresponds to capacitor $C_3$ in Fig. 1) is connected from the common junction of these two last-named electrodes to ground. A connection extends from the ungrounded terminal of capacitor 19 through the other secondary winding 20 of transformer $T_3$ to the grid of a cathode follower triode structure 21 in the cathode follower unit 2. Triodes 14 and 21 may be in the same envelope, as indicated, this tube being for example a type 12AU7.

In order to provide the proper positive operating bias for the grids of triode structures 14 and 21, a pair of resistors 22 and 23 (for example, two megohms each) are connected in series between the cathode of diode 10 and the anode of diode 11, and the common junction of these two resistors is connected to a suitable source of positive potential, of about 75 volts. Three resistors 24, 25 and 26 (resistor 25 being potentiometric, of a value of 100,000 ohms and resistors 24 and 26 each being equal in value to resistor 22) are connected in series between the cathode of diode 17 and the anode of diode 18, and the positive 75-volt potential is applied to the movable tap on potentiometer 25. Each portion of the phase-sensitive detector 1 (one portion including diodes 10 and 11 and the other portion including diodes 17 and 18) operates in exactly the same way as the phase-sensitive detector 1 in Fig. 1, previously described, to produce a charge on its respective capacitor 12 or 19 which is proportional at all times to the phase of an A. C. data voltage with respect to the reference voltage, or to the amplitude of a varying-amplitude data voltage. However, since the supply of data voltage components to the two portions of the phase-sensitive detector is push-pull, the charges on these two capacitors are of opposite polarities, so that the voltages across these two capacitors, although D. C., may be thought of an analogous to push-pull.

Transformer $T_3$ serves to couple any desired A. C. information voltage, in push-pull fashion, onto the grids of triode structures 14 and 21, along with the D. C. outputs of the respective portions of the phase-sensitive detector 1. The primary winding of transformer $T_3$ is coupled to any desired A. C. information voltage source, just as in Fig. 1. Thus at the grids of triode structures 14 and 21 there are composites of D. C. and A. C. signals, and the signals at the two grids are in push-pull.

Each of triode structures 14 and 21 functions as a cathode follower amplifier for driving its respective diode switch 3. The anode of structure 14 is connected to the positive terminal B+ of a unidirectional potential source and the cathode of this structure is connected through a resistor 27 and a portion of potentiometric resistor 28 to ground by way of the grounded tap on 28. Thus, the composite of D. C. and A. C. signals applied to the grid of structure 14 is translated by this structure and appears between the cathode of this structure and ground, across resistor 27 and the upper portion of resistor 28. Likewise, the anode of structure 21 is connected to the positive terminal B+ of the unidirectional potential source and the cathode of this structure is connected through a resistor 29 and the remaining portion of resistor 28 to ground. The composite of D. C. and A. C. signals applied to the grid of structure 21 appears between the cathode of this structure and ground, across resistor 29 and the lower portion of resistor 28. Thus, the structures 14 and 21 serve as push-pull triode cathode followers.

A pair of diodes arranged similarly to diodes $V_4$ and $V_5$ in Fig. 1, is provided in each half of the push-pull circuit to constitute the push-pull diode switch 3. Thus, the cathode of triode cathode follower structure 14 is connected directly to the cathode of a diode 30, and the anode of this diode is connected directly to the anode of another diode 31 the cathode of which latter diode is connected to one output lead 32 which is connected to the grid of an output cathode follower driver triode 33 which constitutes one-half of the cathode follower output circuit 4. As will become later apparent, the output lead 32 is one of the two push-pull output leads, which is common to a plurality of multiplex channels, and the triode 33 is one of the two push-pull cathode follower output or driver circuit tubes, which is common to a plurality of multiplex channels. A resistor 34 (which is analogous to $R_6$ in Fig. 1) is connected from lead 32 to ground. Diodes 30 and 31 may be in the same envelope, these diodes being a type 6AL5 tube. Similarly, the cathode of triode cathode follower structure 21 is connected directly to the cathode of a diode 35, and the anode of this diode is connected directly to the anode of another diode 36 the cathode of which latter diode is connected to another output lead 37 which is connected to the grid of an output cathode follower driver triode 38 which constitutes the other half of the cathode follower output circuit 4. The output lead 37 is the other of the two push-pull output leads, which is common to a plurality of multiplex channels and the triode 38 is the other of the two push-pull cathode follower output or driver circuit tubes which is common to a plurality of multiplex channels. A resistor 39 (which is analogous to $R_6$ in Fig. 1) is connected from lead 37 to ground. Diodes 35 and 36 may be in the same envelope, these diodes being a type 6AL5 tube. The two triodes 33 and 38 may be in the same envelope, and a type 12AU7 tube may be used here.

A positive gating pulse (having an amplitude, for example, of 130–150 volts), derived from a suitable source of rectangular waves, is applied through a resistor 40 (analogous to $R_5$ in Fig. 1) to the common junction of the anodes of diodes 30 and 31, and is also applied through a resistor 41 (again analogous to $R_5$ in Fig. 1) to the common junction of the anodes of diodes 35 and 36. When a positive gating voltage or gating pulse is applied through resistors 40 and 41 to the respective pairs of diodes, diodes 30, 31, 35 and 36 all conduct, in the same way as diode pair $V_4$, $V_5$ in Fig. 1. Since these diodes when conducting are of fairly low impedance, the voltage output of cathode follower structure 14 (the voltage between the cathode of this structure and ground) will then appear across resistor 34 and the voltage output of cathode follower structure 21 (the voltage between the cathode of this structure and ground) will then appear across resistor 39. As previously stated, the voltage outputs of both these cathode follower structures are a composite of A. C. and D. C. signals and are in push-pull relation to each other, so that when the push-pull diode switch 3 is closed by gating on the diodes 30, 31, 35 and 36, the voltages across resistors 34 and 39 will both be the same composite of A. C. and D. C. signals and will be in push-pull relation to each other. Each of resistors 40 and 41 is considerably larger than the impedance looking into the cathode of the respective cathode follower structure 14 or 21, so the positive gating pulse does not raise appreciably the voltage across the respective cathode load resistors of these structures. The diodes 30, 31, 35 and 36 conduct only when a positive voltage is applied to the common junction of resistors 40 and 41, so that these diodes switch or gate the push-pull output of structures 14 and 21 to the respective leads 32 and 37 and to the respective resistors 34 and 39.

In the push-pull arrangement of Fig. 2, the potentiometer 25 corresponds to the potentiometer $R_2$ in Fig. 1. This potentiometer serves to balance the output voltage of the channel described, so that the voltage across resistor 34 (the voltage from lead 32 to ground) and its counterpart in the other half of the push-pull circuit (the voltage across 39, or the voltage from lead 37 to ground) are exactly the same with zero input voltage (i. e., with zero "data voltage" and and zero "A. C. information voltage").

The voltage across resistor 34 is applied as an input voltage to the grid of the driver cathode follower amplifier tube 33, which serves as one-half of the push-pull output or driver amplifier 4. The anode of triode 33 is connected directly to the positive terminal B+ of a unidirectional source and this triode provides one-half of a push-pull cathode follower output voltage between its cathode and ground. The cathode of triode 33 is connected through a resistor 42 and a portion of a potentiometric resistor 43 to ground by way of the grounded tap on 43. The voltage across resistor 34 (between lead 32 and ground) is translated by triode structure 33 and appears between the cathode of this structure and ground, across resistor 42 and the upper portion of resistor 43. The voltage across resistor 39 is applied as an input voltage to the grid of the driver cathode follower amplifier tube 38, which serves as the other half of the push-pull output or driver amplifier 4. The anode of triode 38 is connected directly to the positive terminal B+ and this triode provides the other half of a push-pull cathode follower output voltage between its cathode and ground. The cathode of triode 38 is connected through a resistor 44 and the remaining portion of the potentiometric resistor 43, to ground. The voltage across resistor 39 (between lead 37 and ground) is translated by triode structure 38 and appears between the cathode of this structure and ground, across resistor 44 and the lower portion of resistor 43. The push-pull cathode follower output of the system described is taken between a pair of leads 45 and 46 coupled respectively to the cathodes of triode structures 33 and 38. Thus, whatever push-pull voltage is gated onto the output leads 32 and 37 at any particular time, appears at that same particular time between the cathode follower output leads 45 and 46. The push-pull output between leads 45 and 46 may be utilized in any suitable manner, such as by application of the same to one of the deflection amplifiers of a cathode-ray oscilloscope.

According to this invention, a plurality of information channels are utilized, each channel being provided with a push-pull diode switch exactly similar to the diode switch 3 previously described in connection with Fig. 2, the output sides of all these switches being connected to the common push-pull output leads 32 and 37, one push-pull side of every diode switch being connected to lead 32 and the other push-pull side of every diode switch being connected to lead 37. All of the outputs of the push-pull diode switches are thus connected together and the push-pull signals of the various information channels (each of which, as previously described, may be a composite of A. C. and D. C. signals) are applied to the input resistors 34 and 39 of the push-pull driver cathode follower 4, whenever the push-pull diode switches 3 are closed. In other words, whenever any one of the diode switches 3 is closed, the push-pull signal intelligence from the corresponding channel is applied to the common leads 32 and 37, which are the input leads for the push-pull driver cathode follower 4.

With six parallel intelligence channels, the positive gating voltage (which closes the push-pull diode switches in the channels) is applied to each push-pull diode channel switch in sequence, in the form of a gating pulse. Then, the push-pull output signal between leads 45 and 46 will consist of six intelligence signals which appear thereat in sequence, in other words, it will be like a time division multiplex signal. The push-pull output signal is then six time-shared displays of intelligence, since the channel switching is designed to take place sequentially and repetitively.

Although six channels have been referred to, only four channels numbered 1, 2, 3 and 4 are illustrated in Fig. 2, for the sake of simplicity. Thus, a signal translating and mixing system 47, exactly similar to channel #1 and including exactly the same circuit components, has the output side of its push-pull diode switch connected to the push-pull output leads 32 and 37, in the manner previously described. Positive gating pulses are supplied to the push-pull diode switch of system 47, in time-spaced relation to the similar pulses supplied to the push-pull diode switch 3 comprising diodes 30, 31, 35 and 36, thus coupling the intelligence of channel #2 to leads 32 and 37 (and the common push-pull output leads 45, 46) when the diode switch of channel #2 closes. The system 47 comprises an information channel #2 to which are supplied an A. C. reference voltage, an A. C. data voltage, and an A. C. information voltage, in addition to the positive gating pulses previously referred to. The data and information voltages supplied to this second channel are ordinarily different in value from the corresponding voltages supplied to channel #1.

All of the displays or outputs which share time on the common indicator in the manner described do not require the complete set of A. C. and D. C. information. For example, for some particular information channel (some particular display) it might not be necessary to add A. C. signal information to the D. C. output of the push-pull phase-sensitive detector. In such case, the transformer $T_3$ would be omitted and the output of the push-pull detector 1 would be coupled directly to the input or grid circuits of the push-pull triode cathode follower structures 14 and 21.

For some other particular information channel (some other particular display) it might not be necessary to utilize any D. C. information, and an arrangement whereby this may be accomplished is illustrated in Fig. 2, channel #3. In this channel, the phase-sensitive detector 1 is eliminated and the A. C. information voltage is supplied to the primary winding of a push-pull input transformer $T_4$ having a secondary winding the opposite ends of which are connected to the grids of the respective cathode follower triode structures 14 and 21. For properly biasing the grids of these tubes, a predetermined positive potential is supplied to a centertap on the secondary winding of transformer $T_4$. From the push-pull cathode follower structures 14 and 21 on, the remainder of the circuit of channel #3 is exactly the same as that of #1. The push-pull A. C. signal appearing at the cathodes of triodes 14 and 21 is coupled through the push-pull diode switch 3 (including diodes 30, 31, 35 and 36) to the push-pull output leads 32 and 37. Positive gating pulses are supplied to the push-pull diode switch of channel #3, in time-spaced relation to the similar pulses supplied to the push-pull diode switches of channels #1 and #2, thus coupling the intelligence of channel #3 to leads 32 and 37 (and the common push-pull output leads 45, 46) when the diode switch of channel #3 closes.

For still another particular information or data channel (still another particular display) it might be necessary to gate only a reference (D. C.) voltage to the common output leads 45, 46, and an arrangement whereby this may be accomplished is illustrated in channel #4. In this channel, a triode 48 (which may, for example, be half of a 12AU7 tube) is connected to act as a cathode follower voltage regulator to supply a reference voltage to the push-pull-connected diode switch 3 of this channel. For this purpose, a positive reference potential (for example, about 75 volts) is applied to the grid 49 of tube 48, a capacitor 50 being connected from grid 49 to ground. The anode of tube 48 is connected to the positive terminal B+ of the unidirectional potential source, while the cathode of this tube is connected through a load resistor 51 to ground. A reference D. C. voltage thus appears at the cathode end of this resistor, and the cathode end of such resistor is coupled to the input side of the push-pull-connected diode switch 3 of channel #4, that is, the cathode of tube 48 is connected to the cathode of diode 30 and to the cathode of diode 35. The reference D. C. signal appearing at the cathode of triode 48 is thus coupled through the diode switch 3 of channel #4 to the push-pull output leads 32 and 37. Positive gating pulses are supplied to the diode switch of channel #4, in time-spaced relation to the similar pulses applied to the push-pull diode switches of channels #1, #2 and #3, thus coupling the intelligence (D. C. reference voltage) of channel #4 to leads 32 and 37 (and to the common push-pull output leads 45, 46) when the diode switch of channel #4 closes.

As an example, typical values for certain of the components of the circuit of this invention are set out below. These values are given in addition to those mentioned previously and are for an arrangement built according to this invention and successfully tested.

| | | |
|---|---|---|
| Resistor **27** | ohms | 27,000 |
| Resistor **28** | do | 5,000 |
| Resistor **29** | do | 27,000 |
| Resistor **34** | do | 330,000 |
| Resistor **39** | do | 330,000 |
| Resistor **40** | do | 180,000 |
| Resistor **41** | do | 180,000 |
| Resistor **42** | do | 22,000 |
| Resistor **43** | do | 5,000 |
| Resistor **44** | do | 22,000 |
| Resistor **50** | do | 27,000 |
| Capacitor **8** | mfd | 0.22 |
| Capacitor **9** | mfd | 0.22 |
| Capacitor **12** | mfd | 0.05 |
| Capacitor **15** | mfd | 0.22 |
| Capacitor **16** | mfd | 0.22 |
| Capacitor **19** | mfd | 0.05 |
| Capacitor **49** | mfd | 0.05 |

What is claimed is:

1. In an information sampling system, a phase-sensitive detector, means for supplying to said detector a reference voltage of predetermined frequency, means for supplying to said detector an information voltage of said predetermined frequency but of variable phase dependent upor said information, said detector operating to produce a direct current voltage output depending upon the phase of said information voltage relative to said reference voltage, means for superimposing an alternating current information voltage on the direct current voltage output of said detector to produce a resultant voltage, an output circuit, a voltage-responsive electronic switch constructed and arranged when closed to couple said resultant voltage to said output circuit, and means for supplying a voltage to said switch to close the same.

2. In an information sampling system, a phase-sensitive detector, means for supplying to said detector a reference voltage of predetermined frequency, means for supplying to said detector an information voltage of said predetermined frequency but of variable phase dependent upon said information, said detector operating to produce a direct current voltage output depending upon the phase of said information voltage relative to said reference voltage, means for superimposing an alternating current information voltage on the direct current voltage output of said detector to produce a resultant voltage, a cathode follower amplifier having an input connection and a cathode load resistor, means coupling said resultant voltage to said input connection, an output circuit, a voltage-responsive electronic switch connected in series between the cathode of said amplifier and said output circuit, and means for supplying a voltage to said switch to close the same.

3. In an information sampling system, a phase-sensitive detector, means for supplying to said detector a reference voltage of predetermined frequency, means for supplying to said detector an information voltage of said predetermined frequency but of variable phase dependent upon said information, said detector operating to produce a direct current voltage output depending upon the phase of said information voltage relative to said reference voltage, means for superimposing an alternating current information voltage on the direct current voltage output of said detector to produce a resultant voltage, a cathode follower amplifier having an input circuit, a voltage-responsive electronic switch constructed and arranged when closed to couple said resultant voltage to said cathode follower amplifier input circuit, and means for supplying a voltage to said switch to close the same.

4. In an information sampling system, a phase-sensitive detector, means for supplying to said detector a reference voltage of predetermined frequency, means for supplying to said detector an information voltage of said predetermined frequency but of variable phase dependent upon said information, said detector operating to produce a direct current voltage output depending upon the phase of said information voltage relative to said reference voltage, means for superimposing an alternating current information voltage on the direct current voltage output of said detector to produce a resultant voltage, a cathode follower amplifier having an input connection and a cathode load resistor, means coupling said resultant voltage to said input connection, a cathode follower amplifier having an input circuit, a voltage-responsive electronic switch connected in series between the cathode of said first-mentioned amplifier and said cathode amplifier input circuit, and means for supplying a voltage to said switch to close the same.

5. In an information sampling system, a phase-sensitive detector, means for supplying to said detector a reference voltage of predetermined frequency, means for supplying to said detector an information voltage of said predetermined frequency but of variable phase dependent upon said information, said detector operating to produce a direct current voltage output depending upon the phase of said information voltage relative to said reference voltage, means for superimposing an alternating current information voltage on the direct current voltage output of said detector to produce a resultant voltage, a cathode follower amplifier having an input connection and a cathode load resistor, means coupling said resultant voltage to said input connection, a cathode follower amplifier having an input circuit, a diode electron discharge device, means coupling one electrode of said device to the cathode of said first-mentioned amplifier, means coupling the other electrode of said device to said cathode follower amplifier input circuit, and means for supplying a gating voltage to said other electrode of said device to cause said device to conduct.

6. In an information sampling system, a phase-sensitive detector, means for supplying to said detector a reference voltage of predetermined frequency, means for supplying to said detector an information voltage of said predetermined frequency but of variable phase dependent upon said information, said detector operating to produce a direct current voltage output depending upon the phase of said information voltage relative to said reference voltage, means for superimposing an alternating current information voltage on the direct current voltage output of said detector to produce a resultant voltage, a cathode follower amplifier having an input connection and a cathode load resistor, means coupling said resultant voltage to said input connection, a second cathode follower amplifier having an input circuit, a pair of diode electron discharge devices, means coupling one electrode of one of said devices to the cathode of said first-mentioned amplifier, means coupling a similar electrode of the other of said devices to said input circuit of said second cathode follower amplifier, means coupling the remaining electrodes of said two devices together, and means for supplying a gating voltage to the last-mentioned coupled electrodes to cause said devices to conduct.

References Cited in the file of this patent

UNITED STATES PATENTS

| | | |
|---|---|---|
| 2,199,634 | Koch | May 7, 1940 |
| 2,526,425 | Schultheis | Oct. 17, 1950 |
| 2,557,729 | Eckert | June 19, 1951 |
| 2,563,589 | Den Hertog | Aug. 7, 1951 |
| 2,616,960 | Dell et al. | Nov. 4, 1952 |
| 2,622,193 | Clayden | Dec. 16, 1952 |
| 2,694,143 | Chambers | Nov. 9, 1954 |
| 2,703,380 | Fraser | Mar. 1, 1955 |
| 2,751,555 | Kirkpatrick | June 19, 1956 |